United States Patent [19]
Hotchner

[11] 3,723,962
[45] Mar. 27, 1973

[54] APPARATUS FOR INDICATING THE DIRECTION TO A SOUND PULSE SOURCE

[76] Inventor: Fred Hotchner, 13400 Sherman Way, North Hollywood, Calif. 91605

[22] Filed: Oct. 9, 1970

[21] Appl. No.: 79,493

[52] U.S. Cl.............340/16 R, 181/0.5 ED, 181/26, 340/8 FT
[51] Int. Cl.................................................G01s 3/00
[58] Field of Search...........340/8 FT, 8 L, 6 R, 16 R; 181/.5 ED, .5 R, 26, 27 R

[56] References Cited

UNITED STATES PATENTS

| | | | |
|---|---|---|---|
| 1,299,616 | 4/1919 | Rieber | 340/8 FT |
| 3,389,372 | 6/1968 | Halliday et al. | 340/8 FT |
| 3,305,043 | 2/1967 | Pfund et al. | 181/0.5 R |
| 3,599,477 | 8/1971 | Cohen et al. | 340/5 MP |

*Primary Examiner*—Richard A. Farley
*Attorney*—Fulwider, Patton, Rieber, Lee & Utecht

[57] ABSTRACT

Apparatus including a reflector constituting a part of a spherical, cylindrical or other concave reflecting surface and a thin film detector of concentric or flat planar shape located in the focusing zone of the reflector between the center of curvature and the reflecting surface. The detector is provided with means, such as a high cracking lacquer coating which will be fractured in the focal zone of the sound pulse, to provide a line-of-sight locating point which, in a three-element device, is combined with the center of curvature of the reflector to give the line-of-sight direction to the source of the sound pulse, the focal point for any sound source falling on a line drawn through the center of curvature of the reflector to that source. Instead of the center of curvature, means indicating a line or plane therethrough may be used with the lacquer fracture point to determine the direction to the sound source. In a two-element device the detector may comprise a photographic film on which there appears an inverted image of the field of view whereby the location of the fracture point on the image indicates the direction to the sound source, in which case the center of curvature and the line or plane therethrough are unnecessary.

24 Claims, 18 Drawing Figures

Patented March 27, 1973

INVENTOR
FRED HOTCHNER
By Fulwider, Patton, Rieber, Lee, and Utecht
ATTORNEYS

Patented March 27, 1973

INVENTOR
FRED HOTCHNER
By Gulwider, Patton, Rieber
Lee, and Utecht
ATTORNEYS

INVENTOR.
FRED HOTCHNER
BY Fulwider, Patton, Rieber, Lee, and Utecht
ATTORNEYS

APPARATUS FOR INDICATING THE DIRECTION TO A SOUND PULSE SOURCE

BACKGROUND OF THE INVENTION

This invention relates to the field of devices for indicating the direction to a sound pulse source, such as a gun shot.

The determination of the direction to a distant sound pulse source, such as a gun shot, where no visual directional aid is available, has been the subject of much research without providing a simple and inexpensive device which may be understood and handled by non-technical personnel and which may be readily applied under conditions of warfare or civil riot to provide a line-of-sight to a sniper, mortor operator or the like, whose location cannot be visually determined. An example of the complicated systems of the prior art is found in the electronic system using a pair of spaced directional microphones of the hot wire type, with a cathode ray tube indicator, found in the U.S. Pat. to Snyder No. 2,962,696.

The sound source directional indicating apparatus of this invention is non-electronic and readily understood and handled by non-technical personnel. It is producible from materials quickly available with very limited investment and readily assembled by any competent mechanic. Its cost is so low that it may be considered as throw-away equipment, expendable in preference to recovery from a hazardous location. It affords direct visual bearing on a sound pulse source immediately after the pulse is heard and without calculation. It may be embodied in a three-element device comprising a concave reflector having an interior surface which is either partially spherical or partially cylindrical, and for which either the center of curvature or the line or vertical plane therethrough is known, and a thin film detector diaphragm having a high cracking lacquer coating thereon located in the focal zone of the reflector which lies between the reflector and its center of curvature. The sound pulse is focused in the focus zone on a line running through the center of curvature to the sound pulse source and the focused sound waves crack the lacquer coating to provide an aiming point which, together with the center of curvature or the line or plane therethrough, indicates the direction to the sound source. The invention may also be embodied in a two-element device employing only the reflector and the thin film detector which bears an inverted image of the field of view to provide a cracked lacquer indication on the image of the sound source location. In both embodiments an immediate indication is given of the location of the sound source or gun shot without calculation or adjustment.

It is known that pulses which are heard as sharp sounds usually consist of wave trains of substantial length and in many cases may attain a variety of frequencies. Devices of this invention are distinguished from prior art devices which are selectively limited to the first received high value of a group train, to one-half of the wave, or to a specific frequency or frequency band since such devices are inherently of very low efficiency. The apparatus of the present invention, on the contrary, provides high sensitivity by being responsive to vibratory energy of all contained frequency of both signs and for the entire length of the detected pulse.

SUMMARY OF THE INVENTION

The present invention provides apparatus for immediately indicating by direct observation the source of a sound pulse such as the gun shot of a concealed sniper by markings left on a detector diaphragm by the pressure pulse of the received sound.

The sound waves from the source are received on the concave face of an acoustic reflector whose interior surface has a spherical, cylindrical or other contour which converges the sound waves to a focal region located between the concave reflecting surface and the center of the curvature thereof, such focal region extending for a substantial distance generally concentric with the reflecting surface.

In the focal region is placed a thin film detector diaphragm which may either be substantially concentric with the reflecting surface, for maximum efficiency, or which may be flat and located so that its major areas are within the focal region. In the two-element apparatus according to the present invention, where the detector diaphragm incorporates an image of the field of view upon which the marking of the sound pulse is superimposed, no further major elements are required and, with the detector diaphragm properly located, the marking from the sound pulse on the image will show the direction to the sound source or sniper in the actual scene. Such detector diaphragm images may be collected after a shot from unmanned apparatus to give the sniper location for a previous shot and may be passed around for studies by others on the scene. The two-element device also lends itself to the use of unmanned devices where the diaphragm detector is reticulated for comparison to the field of view, either directly or to an image thereof. Likewise two or more two-element devices may be spotted unattended and the sound source location found by triangulation from several recordings at spaced locations in known plotting procedures.

A preferred form of the invention, particularly usable with a manned device, employs an additional main element so that it may be termed a three-element device. In addition to the acoustic reflector and the detector diaphragm, the three-element device includes a center of curvature indicator or means providing a line or plane from the observer through the center of curvature. In the operation of the three-element device the marking on the detector diaphragm made by the sound pulse is aligned with the center of curvature indicator or the line or vertical plane therethrough and the resulting line or plane gives the direction to the sound pulse source.

The acoustic reflector may be made of a molded transparent plastic such as an acrylic resin marketed commercially under the trademark "PLEXIGLAS" or, alternatively, may have an outer annulus formed of metal such as aluminum or the like and only its central, see-through portion made of the transparent plastic. On the reflector is mounted means for supporting the detector diaphragm in the focal region of the reflecting surface, the diaphragm being either curved concentrically with the reflecting surface or of flat, planar form. The detector diaphragm is preferably formed of a thin, strong plastic film such as the polyester marketed commercially under the trademark "MYLAR" and of a thickness which may vary greatly depending on the sensitivity and sound transparency required but which should lie between 0.0005 inch and 0.010 inch and preferably in the neighborhood of 0.0003 inch.

The detector diaphragm is preferably pressure sensitive in a manner to pass the main, incident sound waves but responsive to the concentration of the waves in the focal region to be marked itself with the location of the sound wave concentration on the diaphragm surface. Such concentration will always occur on a line passing through the sound source and the center of curvature of the reflector so that lining up the marking on the detector diaphragm produced by the concentrated sound waves with the center of curvature will give the direction to the sound source, there being practically no drift to the sound waves over the distances under consideration.

The detector diaphragm may be made pressure responsive to produce the desired marking at the point of sound wave concentration thereon by any desirable means and material, for example the diaphragm may itself be made of a very thin glass which will pass the incident sound waves but will fracture at the point of their concentration in the focal region. However, a preferred construction is to use a thin polyester film as previously described, one side of which is coated with a clear, low-adhesion, high-cracking lacquer which will normally be substantially thinner than the thickness of the supporting film. The combined film and lacquer coating will pass the incident sound waves without materially affecting the lacquer coating but when the reflected sound is concentrated in the focal region it will produce such a flexure of the diaphragm as to crack the lacquer coating from the film thereat to form an uncoated spot which is the marking referred to above caused by the concentrated sound waves which, coupled with the center of curvature or the line or plane therethrough, gives the direction to the source of the sound, specifically a concealed sniper who has shot a gun. By the three-element device an operator may have direct line-of-sight bearing on the location of the sound source immediately after the sound is heard and without calling for any instrumental adjustment or calculation on his part, thus quickly revealing the location of a concealed sniper before he changes his position to evade return fire.

Since the detector diaphragm is positioned between the acoustic reflector and the field of view it should offer minimum impedance to and distortion of the incident sound waves even when the detector is of such width as to intercept a material percentage of the received wave section. The transparency of the detector diaphragm to sound waves may be increased by its thin film construction and the freedom of its mounting.

The directional indicating units of this invention operate on simple optical and acoustical principles without the necessity of electronic elements and are extremely simple and easy to operate without special technical skills. They are light in weight, rugged, portable and low in initial and maintenance cost.

Manned devices, more particularly of the three-element type, under the present invention may be readily provided for use under full dark conditions by giving luminous indication to the operator of both the marking on the detector diaphragm and of the center of curvature of the reflector, which indications, while visible to the operator to determine the direction to the sound source, are invisible to a suspect in the field forward of the directional device.

Other objects and features of the invention will be apparent to those skilled in the art from the following detailed description and the appended drawings.

DESCRIPTION OF THE PREFERRED EMBODIMENTS

The first embodiment of the three-element directional device according to the present invention is illustrated in FIGS. 1 through 8. It is composed of three main elements: a concave reflector indicated generally by the numeral 1, a detector diaphragm 2 generally concentric with the concave reflecting surface when the detector diaphragm is in operating position, and a center of curvature indicator, these elements being shown in FIG. 2 in their operating positions and in FIG. 1 in their folded position for storage and carrying. In operating position, the centers of the reflector and the detector diaphragm are aligned with the center of curvature 3 along the instrument axis X—X which is to be aimed generally toward the center of the field of view which is to be examined by the directional device.

The reflector 1 has a concave reflecting surface 5 which is presented toward the field of view and which constitutes a portion of a spherical surface and may be constructed of a spherical contoured ring or annulus 6 of sheet aluminum which encloses a spherical contoured disk 60 of glass or a transparent acrylic resin such as "PLEXIGLAS" providing for viewing therethrough, and meeting and continuing the spherical contour of the ring 6 to produce the complete spherical contoured reflecting surface 5. The ring 6 may have a rolled rim 7 at its outer edge for rigidity, and a backset flange 8 at its inner edge receiving the transparent disk 60. Rigidly secured to the back of the ring 6 are a carrying handle 9 and a boss or lug 10 for attachment to any desired supporting means such as a ground base 4 shown in FIGS. 1-3.

The detector diaphragm 2 is composed of a spherical contoured thin plastic film base which may be cemented to a resilient ring 12 provided with spring clips 13-16 by which it is held to a ring 11 as a support therefor. The supporting ring 11 is carried by rod-like arms 19-22 and elastic members 23-26 attached to the forward ends of the rod arms 19-22 by the interlocking eyes shown in FIG. 7. The inner ends of the elastic members 23-26 connect to the supporting ring 11 on which the detector diaphragm 2 is removably mounted. The back ends of the rod arms 23-26 are rigidly attached to a flexible toroidal ring 18 which is rotatably supported adjacent the outer edges of the reflector surface 5 by bearings 28-31. The toroidal ring 18 may be composed of any suitable rod, wire or flexible shaft core stock having longitudinal flexibility and tortional rigidity to constrain all of the rod arms 19-22 to simultaneous movement between the positions of FIGS. 1 and 2 in the shifting of the detector diaphragm between its extreme positions therein shown. Stop fingers 35-38 which may be welded or otherwise attached to the rod arms 19-22, respectively, engage the reflector surface 5 as a limiting stop in the folded position of the detector diaphragm. Light cables or chains 40 attach the ring 11 to limit the movement of the detector diaphragm in its extended position of FIG. 2. The elastic members 23-26 provide yieldable support for the detector diaphragm 2 and may be selected to provide for movement bodily of the diaphragm support on the application of strong incident sound waves to the diaphragm to increase the transparency of the detector diaphragm to the incident sound waves to which it is subjected and permit their passage, without material distortion, to the reflecting surface 5 of the reflector 1.

Figures 1, 2, 3, 4:
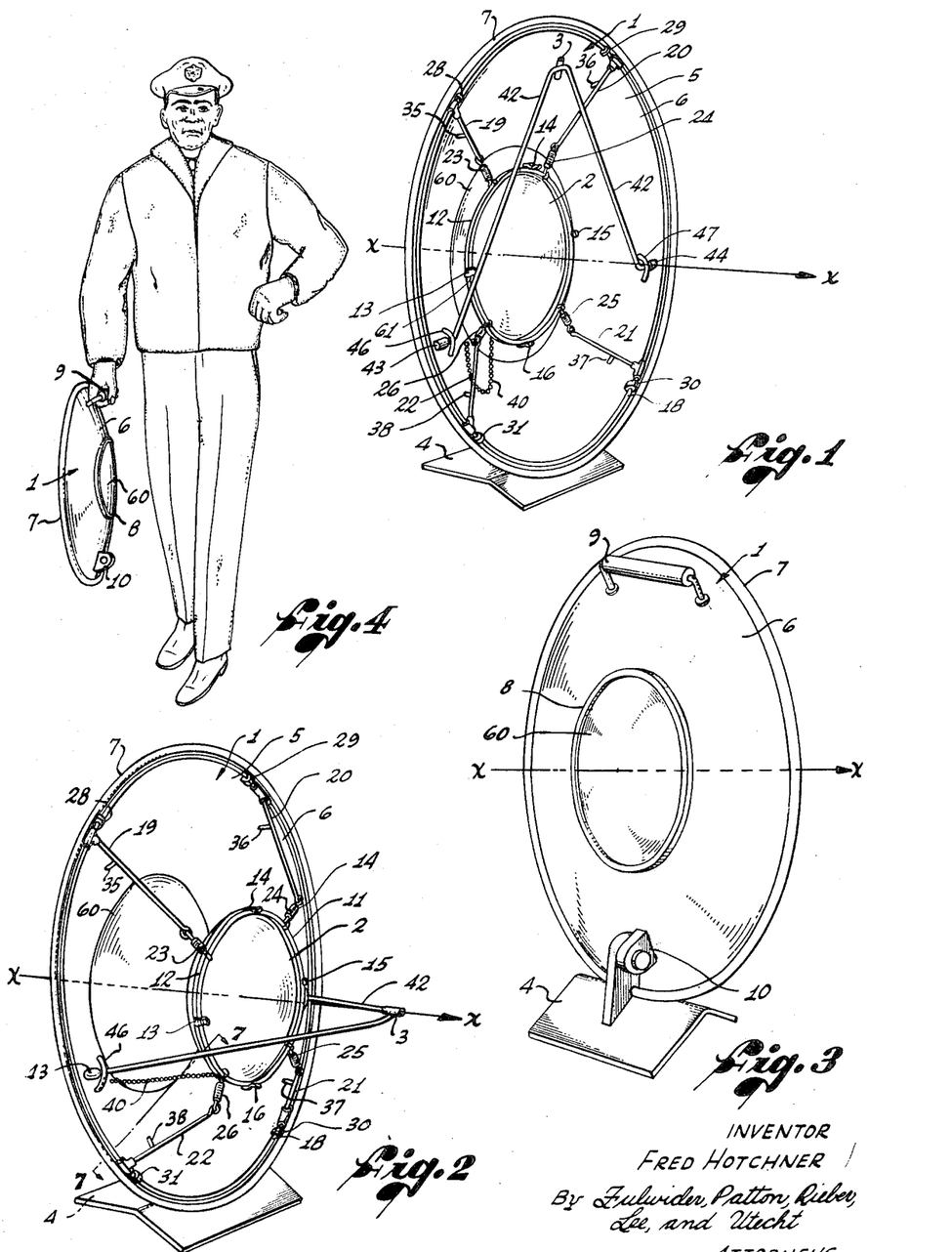
FIG. 1 is a front perspective view of a portable, folded three-element directional device according to the present invention.
FIG. 2 is a front perspective view of the device of FIG. 1 with the detector diaphragm and center of curvature indicator moved forwardly into their operating positions.
FIG. 3 is a back perspective view of the device of FIGS. 1 and 2.
FIG. 4 is a view showing the device of FIG. 1 folded and carried by an operator.
Figure 5:
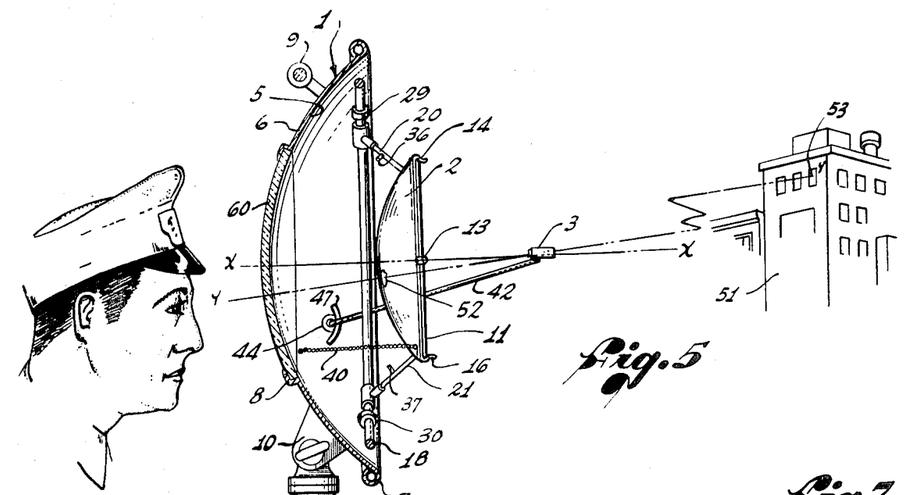
FIG. 5 is a view partly in vertical section and partly in perspective showing the operation of the device of FIGS. 1–3.

As previously described, the detector diaphragm 2 may have a base of a thin transparent plastic film such as the polyester film known commercially by its trademark "MYLAR". The film may be of the order of 0.0005 to 0.010 inch in thickness and may be pressure and temperature molded, according to known commercial practices, into the spherical contoured diaphragm shape illustrated which, in its extended position of FIGS. 2 and 5, is substantially concentric with the reflecting surface 5 of the reflector 1. The film of the detector diaphragm 2 is provided on one side with a thin coating of a clear, low-adhesion, high-cracking lacquer shown at 84 in FIG. 12, in which the film itself is shown in section at 83. The detector diaphragm, before or after being molded to shape and before being coated with the lacquer, is cemented to its supporting ring 12 which carries spring clips 13-16 by which it is mounted on the supporting ring 11.

The center of curvature indicator 3 is swingably mounted for movement between its folded position of FIG. 1 and its extended position of FIG. 2. This center of curvature indicator preferably is the smallest suitable object which is clearly perceptible to the observer while he is holding his eye to a distant focus, without offering too much obstruction to his view of the critical area under observation. To minimize its size the indicator 3 may consist of a wheat-grain incandescent lamp mounted facing backwardly toward the observer so that its light is invisible from the front. It may optionally be integral with a miniature high power battery of the type used in surgery or novelty jewelry which is available in small dimensions. The center of curvature indicator 3 is connected to the ends of forwardly converging rods 42, the rear ends of which are out-turned to pivot in bearings 43 and 44 mounted to the concave surface of the ring 6. Stop fingers 46 and 47 rigidly attach to the rods 42 to provide in-stop and out-stop therefor in the opposite extreme positions of FIGS. 1 and 2.

Figures 6, 7:
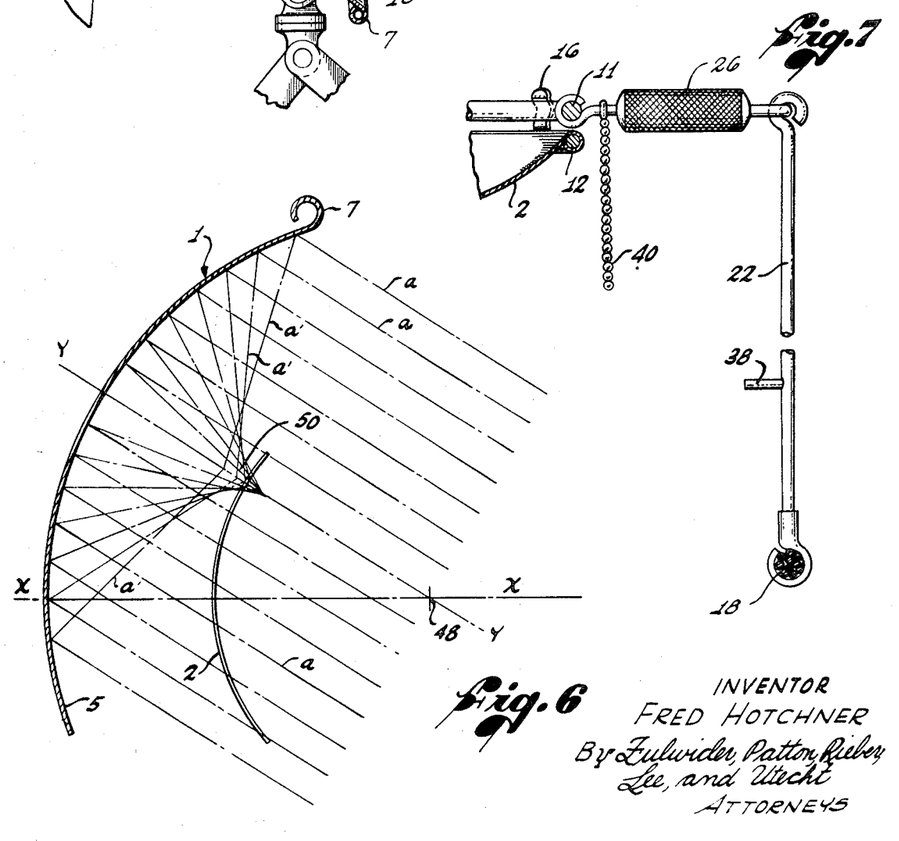
FIG. 6 is a schematic representation of the action of the reflector of the device in focusing the sound waves, and the relation of the detector diaphragm thereto.
FIG. 7 is an enlarged detailed view of the mounting of the detector diaphragm taken in the direction of the arrows 7—7 in FIG. 2.
Figure 8:
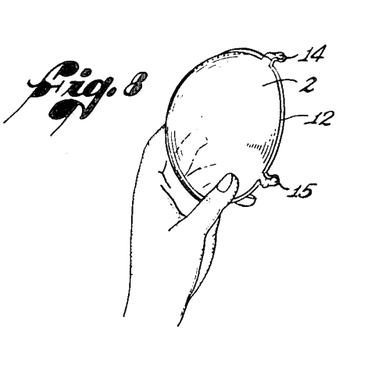
FIG. 8 is a perspective view of a hand-held detector diaphragm as it may be manipulated into and out of the device.

FIG. 6 is a generally diagrammatic representation of the action of the reflector 1 and the detector diaphragm 2 under the action of a sound wave pulse. The center of curvature of the reflector 1 is shown on the instrument axis X—X at point 48. The illustration is that of the sound wave pattern along a medial plane including the instrument axis X—X of a reflector having a spherical-contoured, concave reflecting surface. Such a plane necessarily includes the center of curvature 48 and extends to the source of the incident acoustic waves. It is also illustrative of the sound wave pattern along a plane perpendicularly transverse of a reflector of cylindrical-contoured reflecting surface, intersecting the axis of cylindrical curvature and extending to the source of a sound pulse.

Regardless of the point within the conical space comprising the field of view from which a sound pulse has originated, the reflected beam will always converge to a focal point or area centered along a line from the sound source through the center of curvature of the reflector and perpendicular to the reflecting surface. This line is shown in FIG. 6 at Y—Y and is the directional line from the instrument of this invention to the sound pulse source. This line through the focal point and the center of curvature of the reflector will always be directed toward the sound pulse source regardless of the direction of receipt of the pulse and also regardless of the transverse cross section of the portion of the oncoming pulse which is intercepted by the reflector. Thus any cutoff of the sound waves by the edge of the reflector, which may occur for very wide angles of incidence, will reduce the intensity of the energy delivered to the focal point or area but will not change the focal effect. This permits the design of instruments for extremely wide fields of view and a highly efficient collecting functioning. The line Y—Y, thus determined, constitutes the true line of sight to the sound source for an instrument constructed to permit such sighting as there will be practically no drift of the direction of the sound waves in the distances under consideration.

FIG. 6 illustrates a condition in which the sound pulse source is sufficiently distant so that the lines $a,a,a$, etc. of the incident sound waves are substantially parallel, striking the reflecting surface 5 of the reflector 1 and being reflected as a convergent bundle of lines $a^1$, $a^1$, $a^1$, etc. to the focal point or area indicated generally by the numeral 50, the region of maximum energy concentration being of some finite length substantially centered along the directional line Y—Y. Selecting a plurality of differently-spaced points for the sound pulse source in FIG. 6 and plotting the plurality of focal points or areas 50 therefor, it will be found that these focal points or areas outline a focal region of substantially spherical outline in which the detector diaphragm 2 should be substantially centered. It will therefore be apparent from the diagrammatic representation of FIG. 6 that the preferred shape for the detector diaphragm 2 is also a spherical contour which is substantially concentric with the spherical contour of the reflecting face 5 of the reflector 1. The marking on the detector diaphragm provided by the flake-off of the lacquer coating at the focal point or area 50 will always occur on a line Y—Y through the center of curvature 48 of the reflector 1 to the sound pulse source. It will also be seen from an inspection of FIG. 6 that some of the incident sound waves $a,a,a$, etc. will pass through the diaphragm detector 2 so it is desirably made relatively transparent to the passage of the incident sound waves so that it does not materially impede or distort such incident waves. This characteristic is emphasized by the thinness and flexibility of the film base and also the mounting of the diaphragm resiliently to yield bodily under certain components of the wave train. The detector diaphragm while so passing the incident sound wave will still maintain its sensitivity of response and fidelity of recordation of the reflected concentration.

Figures 13, 14, 15:
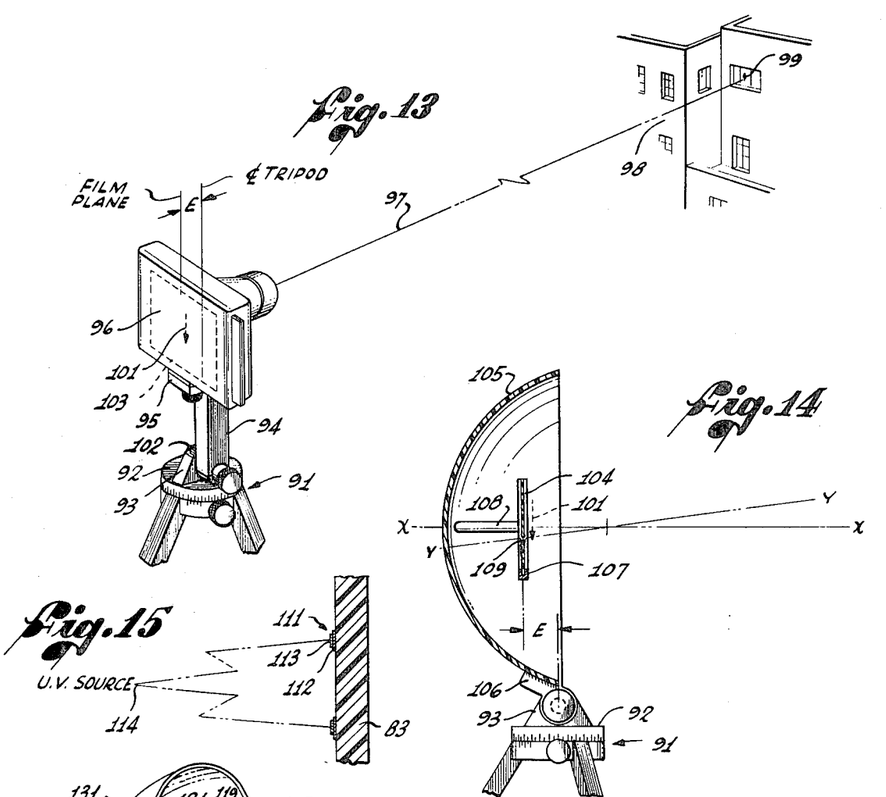
FIG. 13 is a showing in perspective of the photographing of an image of the field of view to be used as a detector diaphragm in a two-element device according to the present invention.
FIG. 14 is a view partly in vertical section and partly in elevation showing a two-element directional device according to the present invention and the location of the film image therein and its coordination with the camera position of the film.
FIG. 15 is an enlarged partial sectional view through a detector diaphragm to be used for night viewing.

While a spherical contoured detector diaphragm has been disclosed heretofore, a flat surfaced detector diaphragm may also be used within practical limits when the advantages of flatness are deemed important, a flat detector diaphragm having the major part of its surface area included within the relatively long extension of the focal area 50 illustrated in FIG. 6 of the drawing. The use of such a flat surface detector diaphragm is shown in FIG. 14 in connection with the two-element directional device therein shown but it is to be realized that the flat surface detector may also be used in the three-element directional device by taking advantage of the elongation of the region of highest focal intensity indicated by the numeral 50. This region has a considerable radial thickness and a flat surface detector diaphragm may have the major portion of its surface area disposed in this radially thick focal region. However, ideally, reflectors of spherical contour preferably would be associated with concentric detectors of spherical contour and reflectors of cylindrical contour with detectors of cylindrical contour, thereby insuring that the major portion of the area of the detector diaphragm will be disposed in the region of highest focal intensity of the reflector. Further, because of the radial elongation of the focal point or area, the instrument will evidence substantially universal focus for sounds sufficiently distant therefrom and located within the conical space apexed at the observer and residing along the instrument axis X—X. Instruments may thus be made to have good sensitivity for wide fields of view and even in such uses as when the sound pulse source is located at a direction angle so extreme that the edge of the reflector itself cuts off a portion of the incident waves, the marking on the detector diaphragm, though reduced somewhat in contrast, may still be recognizable in the direction of the sound source correctly judged from the position of the marking provided.

Figure 10:
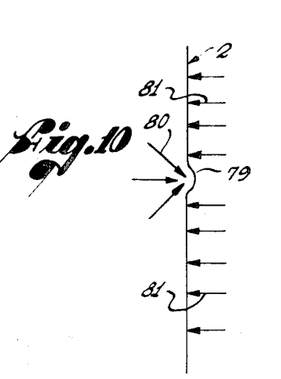
FIG. 10 is a diagrammatic illustration of the action of a flat detector diaphragm under the impingement of received incident sound waves and the concentrated reflected wave.
Figures 11, 12:
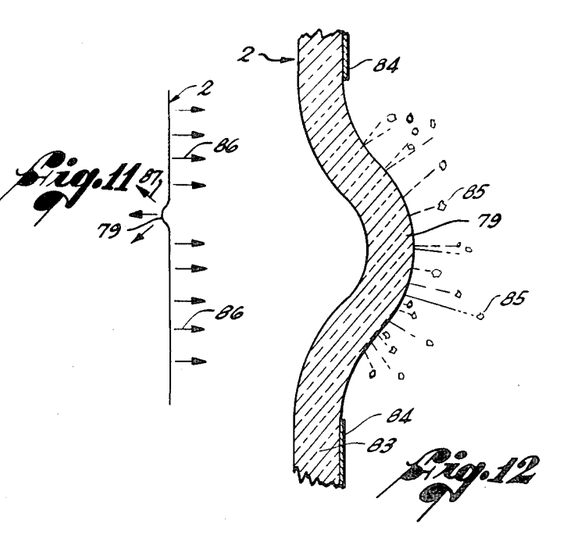
FIG. 11 is a view similar to FIG. 10 but showing the opposite phase of the sound wave.
FIG. 12 is an enlarged cross section of the detector diaphragm at the point of marking thereof by off-flaking of the lacquer coating.

Employment of any suitable type of pressure-sensitive detector or detector diaphragm is contemplated within the scope of the present invention. In general, the detector may be formed of flat or concentrically curved shape from a thin plastic film which may be coated, as previously disclosed, with a clear, low-adhesion, high-cracking lacquer. Also the detector diaphragm may be formed of micro-thin glass or a combination of plastic film with micro-thin glass, in each case the lacquer or glass fracturing at the focal point or area of the reflected sound waves where they are concentrated to effect successive compression and rarefaction effects as the sound waves pass therethrough. These diaphragms may also be contrived to be practically acoustically transparent to the incident sound waves while highly responsive to and providing a marking indicative of the elevated pressure of the focal point or area. FIGS. 10–12 represent more or less diagrammatically a simplified response of the detector diaphragms to the incident and reflected sound waves, the response illustrated being greatly exaggerated for the sake of illustration clarity. Actual yield and displacement may be of the order of only micro-inches and the illustrations, while primarily directed to substantially flat diaphragm surfaces, will be substantially the same for cylindrical, spherical and other suitably contoured diaphragms.

In the operating modes illustrated in FIGS. 10 and 11, it may be considered that in view of the very great length of audible sound waves, the compression and rarefaction due to the wave may change value practically instantaneously on both sides of the thin diaphragm. In the pressure condition of FIG. 10 the compression of the incident sound wave is indicated by the arrows 81 extending substantially uniformly over the diaphragm area on the surface facing the sound source. The compression at the focal point or area is indicated by the arrows 80 converging to the focal point or area coinciding with the film area 79 which is shown as embossed forwardly of the plane of the detector diaphragm. The reverse condition of rarefaction due to the sound wave is illustrated in FIG. 11 which will produce a reversing of the direction of displacement of the diaphragm area 79, the rarefaction forces of the incident wave being indicated by the arrows 86 and of the concentrated reflected wave by the arrows 87. In each case the movement of the local area 79 of the detector diaphragm is sufficient to fracture the glass or flake off the lacquer coating to provide a marking on the detector diaphragm of the position of the sound pulse focal point or area with respect thereto. Such a response is illustrated in FIG. 12 where the film base of the detector diaphragm is shown at 83 provided with a thin lacquer coating 84 which flakes off the fragments 85 from the distorted area 79 of the detector diaphragm.

The action of the detector diaphragms herein contemplated may be considered as responsive to vibratory energy throughout the entire length of a sound pulse for all the frequencies present and for both compression and rarefaction values of the waves. Such response makes for high sensitivity. The lacquer 84 of FIG. 12 may be slightly tinted to exhibit greater contrast to the operator's view without substantial reduction of the clarity of the field of view.

FIG. 5 illustrates the use of the three-element acoustic directional device hereinbefore described in spotting the location of a gun shot source suspected to be located in a distant group of buildings 51. The acoustic directional device has been aimed by directing its instrument axis X—X as well as may be judged toward the suspected sniper position. For this purpose the instrument is mounted on a supporting tripod 49 by mounting the supporting lug or boss 10 thereto so that the instrument may be traversed vertically, while the tripod mounting itself provides for instrument traverse in azimuth. As illustrated, a shot sound has been heard and has caused a marking at 52 on the detector diaphragm 2. The operator is shown sighting along a line Y—Y from the marking 52 through the center of curvature indicator 3, this being directed toward the position of the sniper at 53. The lines X—X and Y—Y in FIG. 5 have the same significance as the similarly-marked lines in FIG. 6.

It is therefore seen that the acoustic directional instrument so far described provides an immediate marking on the detector diaphragm which, when aligned with the indicator of the center of curvature of the reflector, gives the operator an immediate line of sight to the sniper or sound source without the necessity for any adjustment or calculation, the operator viewing immediately through the transparent disk 60 the position of the sniper so that a proper response may be made before the sniper changes his position.

Devices of this general type may be quickly knocked down and folded into compact packages which may be conveniently carried by operators into difficult terrain and set up for operation quickly and with little effort. They may be manufactured so cheaply that they may be considered expendable under battle conditions in preference to risking personal safety for the sake of recovery from hazardous positions.

Figure 9:
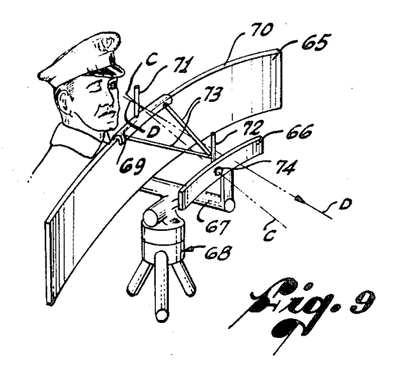
FIG. 9 is a perspective view of a modified form of three-element directional device according to the present invention using a reflector and a detector of cylindrical contour and with a vertical plane through the center of curvature for the third element.

Instruments may be built employing reflectors of cylindrical contour in preference to those of spherical contour, with substantial advantages as to maintenance costs and increased ruggedness in handling and service, compactness and simplicity in operation, and maintenance by non-professional personnel. Detectors for such devices are preferably also of cylindrical contour. Such instruments are sensitive to the sound source position along a line or plane across the field of view rather than to a point and for many types of service such a determination may be sufficient and instruments so contrived may be the more desirable. This type of instrument is illustrated in FIG. 9, which also indicates a variation of the three-element acoustic directional device where, instead of an indicator of the center of curvature or, in the case of a cylinder, of the axis of curvature, there is used a plane-of-sight at right angles to the reflecting surface which passes through the axis of curvature and which is aligned with the detector diaphragm marking to give a plane-of-sight rather than a line-of-sight to the sound source. The reflector is preferably made long and narrow, affording wide horizontal reach for high sensitivity to source positioning in the direction of greatest importance and a low profile for best concealment. Further, since the indication mark on the detector diaphragm is aligned with a vertical plane, the detector may be reduced in height to minimize impedance and distortion of the incident sound pulse wave. It offers minimal obstruction of the field of view and may be opaque rather than transparent as viewing therethrough is not required. Also, in view of the reduced detector diaphragm height, it may be mounted rigidly rather than yieldably without undesirably impeding the incident sound waves.

As shown in FIG. 9, a cylindrical contoured reflector is indicated at 65 and may be of any desired material providing an acoustically reflecting surface, such as polished metal, plastic or the like, and may be opaque, if desired, because viewing may be done thereover. A concentric detector diaphragm is indicated by the numeral 66 and this may be of the material described for the detector diaphragm 2, but also of cylindrical contour about a vertical axis. The reflector 65 and the detector diaphragm 66 are supported in concentric relation on a substantially rigid bar 67 which is mounted on and oriented toward a suspect position by a tripod mounting 68. As will be obvious from FIG. 6, any line radial to the reflector must pass through its axis of curvature and must reside in a vertical plane which cuts the sound source position. Therefore, the center of curvature indicator is not required and is in FIG. 9 eliminated in favor of the reticle pins 71 and 72 supported on an elongated, slidable bearing 69 which is adjustable around the upper edge 70 of the reflector 65. Reticle pin 71 is directly mounted on the slidable bearing 69 and the reticle pin 72 is supported on the bearing on forwardly converging arms 73. The plane through the pins 71 and 72 is always perpendicular to the concave reflecting surface of the reflector 65 and includes the axis of curvature of the reflecting surface.

The instrument axis is here indicated by the line D—D and the plane-of-sight by the line C—C, which lies in the plane including the reticle pin 71, 72 and cutting the marking 74 made by the shot sound on the detector diaphragm 66, as previously described. The operator's plane-of-sight therefore gives the vertical plane in the field of view which cuts the source of the second pulse. Often, this vertical reference is all that is necessary to locate the position of a suspected sniper. If a horizontal plane cutting the sound pulse source is desired, as well as the vertical plane provided by the apparatus of FIG. 9, a second acoustic directional instrument may be used with the receptor 65 and detector diaphragm 66 disposed substantially vertically rather than horizontally so that the plane-of-sight then becomes a horizontal plane and the intersection of the vertical and horizontal planes will give a line-of-sight to the sound pulse source as in the embodiment using a reflector of a spherical contour.

A two-element embodiment of the acoustic directional device of the present invention will be described in connection with FIGS. 13 and 14. In FIG. 13, there is shown a tripod support 91 having a horizontally rotatable head 92 carrying a mounting lug 93 to which is rotatably mounted a camera supporting bracket 94 having a generally horizontal shelf 95 supporting a camera 96. The camera 96 is preferably of the general "POLAROID" type operating on photographic film to provide an immediate positive image of the field of view thereon. The line-of-sight from the camera 96 is shown at 97 directed toward a suspect group of distant buildings 98 and indicating the upright scene by the arrow 99. The image on the photographic film in the camera 96 is inverted, as shown by the inverted arrow 101 within the camera. The camera may be tilted vertically to move a reference line relative to indicia 102 on the mounting lug 93. The plane of the film 103 is at right angles to the line-of-sight 97 and is spaced from the center line of the tripod 91 by the distance, E as indicated.

The camera 96 gives a positive inverted image 101 on either photographic film 103 or on opaque photographic paper. In either case, the image is processed immediately it is taken by the "POLAROID" process to avoid delay or the presence of photographic developing and printing equipment. Where it is desired that the detector diaphragm 104 be transparent, the positive image of the scene is processed directly on photographic film 103 which is preferably of a thickness of the order of the film 83 of the detector diaphragm 2. On the other hand, if the detector diaphragm may be opaque, the scene image may be placed on thin photographic paper providing it is acoustically transparent enough to pass the incident sound waves.

After the image 101 has been placed on the film 103, the camera 96 is removed by removing its supporting bracket 94 and an acoustic reflector of spherical contour 105 is mounted on the mounting lug 93 by its mounting boss 106 which is located in the same relation with respect to the indicia 102 as was the camera 96. The film 103 and its image of the field of view, now designated 104, is coated with the low-adhesion, high-cracking lacquer, as before, and is placed within a frame 107 supported in the focal region of the reflector 105 by a pair of spacing posts 108. The detector diaphragm 104 with the image thereon is held in the frame 107 in the same relation with respect to the center of rotation about the mounting lug 93 and the center line of the tripod as was the photographic film 103 in the camera 96, whereby the inverted positive image of the distant scene, indicated at 101, is properly coordinated with the field of view. Sound waves entering the reflector 104 parallel to the line Y—Y are reflected to the detector diaphragm 104 at a focal point or area 109 to give a marking, such as by flake-off of a lacquer coating or the like, which will be directly correlated with the image of the field of view. The image 101 is inverted with respect to the scene 99 and the reflected sound waves are likewise inverted so that a sniper position in the upper left hand quadrant of the scene 99 will be marked in proper relation in the lower right hand quadrant of the inverted image 101. After the occurrence of a shot sound, the detector diaphragm 104 may be bodily removed from the frame 107 and examined for the location of the marking 109 relative to the image 101 on the diaphragm to give a direct indication of the location of the source sound on the image of the field of view.

The directional device of FIGS. 13 and 14 uses only two major elements and does not make use of the center of curvature of the reflector nor of a plane-of-sight therethrough, and gives direct pictorial representation of the sound pulse source which can be taken from the instrument for direct viewing on the photographic image of the location of the sound source. The reflector 105 may be of any desired acoustic reflecting material which need not be transparent. The two-element acoustic directional device of FIG. 14 may also be used with a reticled detector diaphragm at 104 constructed in accordance with the diaphragm 2 of the three-element acoustic directional device and providing a marking on the detector diaphragm at the focal point or area of the concentrated reflected sound waves. The marked reticled detector diaphragm may be removed from the device and compared exteriorly thereof to the field of view itself or to a photographic image thereof. In both cases, the reticle of the detector diaphragm will be correlated to the scene or its image so that the marking on the detector diaphragm will correctly indicate the location of the source of the sound pulse.

FIG. 15 represents a construction of a detector diaphragm to be used for viewing in the dark. Here, the film of the detector diaphragm is indicated at 83, as in FIG. 12. Upon one face of the detector diaphragm film are placed closely spaced lines which comprise thin layers of high-flaking lacquer at 112 which may have lamp black distributed therethrough to be opaque. On top of the lacquer 112 are printed thin layers 113 of a material which is luminescent under the action of ultraviolet light which is invisible to the human eye, a source of which is indicated at 114 in FIG. 15. Under the action of the ultraviolet light source 114, the lines 113 on the detector diaphragm film 83 will glow only toward the operator as a plurality of closely spaced lines extending across the detector diaphragm. When a shot sound occurs, the lacquer will flake off as at 85 in FIG. 12 and the continuity of the lines 113 will be broken so that the operator will view a grid of lines with what appears to be a hole therein. This hole is the marking on the detector diaphragm which is then aligned with a small wheat-grain light in the indicator 3, to indicate the location of the sound pulse source. Since the lines of the grid which are fluoractive under ultraviolet light are blanked from forward viewing by the opaque lacquer coating 112 and since the wheatgrain light is visible only from the rear, the illumination of both the grid lines and the indicator is visible only to the observer from the back and not from the front by a suspect in the field of view.

Figures 16, 18:
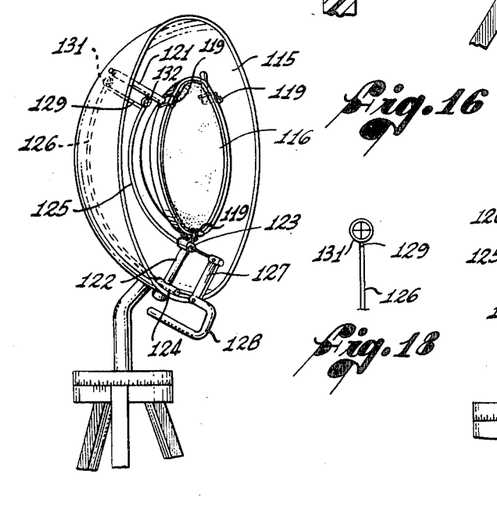
FIG. 16 is a front perspective view of another modified form of a three-element directional device according to the present invention where a line of sight passing through the center of curvature is movable between the reflector and detector diaphragm into alignment with a sound pulse marking on the diaphragm.
FIG. 18 is a detailed view in elevation of one of the line-of8sight providing elements of the device of FIGS. 16 and 17.
Figure 17:
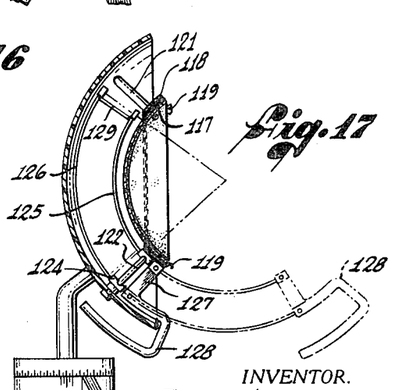
FIG. 17 is a vertical sectional view through the device of FIG. 16 showing further details of the mounting and the parts of the device of FIG. 16.

FIGS. 16–18 illustrate another embodiment of the three-element acoustic directional device where, instead of the indicator of the center of curvature of the reflector, a line-of-sight is used which is always at right angles to the reflecting surface and passes through the center of curvature. In that respect, this embodiment is somewhat similar to the embodiment of FIG. 9 but is applied to a reflector of spherical contour rather than the cylindrical contour FIG. 9. In this embodiment, the reflector 115 may be transparent and formed of an acrylic resin such as "PLEXIGLAS". The detector diaphragm 116 is preferably concentric with the reflector 115 and is disposed in its focal region and may be a construction similar to that of the reflector diaphragm 2 of the first three-element embodiment. The detector diaphragm 116 is cemented or otherwise attached to a peripheral mounting ring 117 which is held against a supporting ring 118 by resilient fingers 119. The ring 118 is supported in fixed position relative to the reflector 115 by a plurality of posts 121 rigidly connected at their opposite ends to the ring 118 and to the reflector 115 at the concave side thereof. The operation of the reflector 115 and the detector diaphragm 116 in securing a marking by the off-flaking of a lacquer coating is the same as on the detector diaphragm 2 of the first embodiment.

On one of the posts 121, shown as that at the bottom in FIGS. 16 and 17, is rotatably mounted a sleeve 122 which supports a pair of spaced guide tubes 123 and 124 thereon. The post 121 extends along a radial line toward the center of curvature and the tubes 123 and 124 are disposed at right angles thereto. Through the tubes 123 and 124 extend a pair of spring steel wires 125 and 126, respectively, which are stressed to be concentric with the concave surface of the reflector 115 and the convex surface of the detector diaphragm 116, as appears more particularly in FIG. 17. These wires 125 and 126 freely slide in the guide tubes 123 and 124 and their bottom, peripheral ends are rigidly connected to a solid cross-bar 127, integrally connected to an outside handle 128. The interior ends of the wires 125 and 126 are secured, as by welding or soldering, to a spacing cross-rod 129 carrying, adjacent its opposite ends, a pair of radially-spaced, cross-hair reticles 131 and 132.

The operation of the embodiment of FIGS. 16 and 17 is much the same as that of FIG. 9 except that it provides line-of-sight rather than plane-of-sight. The operation of the reflector 115 and the detector diaphragm 116 is the same as that disclosed in the first embodiment to secure a marking on the detector diaphragm where the reflected sound waves converge and off-flake a spot from the lacquer coating. The handle 128 rotates the sleeve 122 about its supporting post to move the reticles 131 and 132 between the reflector 115 and the detector diaphragm 116 about the radial line through the post 121. At the same time, the handle moves the cross-bar 127 bodily to move the reticles 131 and 132 toward or away from the post 121 in the space between the reflector and the detector diaphragm, and the combined movements align the reticles 131 and 132 with the marking on the detector diaphragm caused by the focused reflected sound waves. Since the reticles 131 and 132 are restrained to be spaced apart along a radial line at all times, they will, when aligned with the marking spot on the detector diaphragm, give a line-of-sight to the source of the sound pulse. It will be seen that the mounting of the detector diaphragm 116 provides for ready replacement thereof by withdrawing its mounting ring 117 from the holding fingers 119 and replacing it with a mounting ring of a new detector diaphragm supported in the same manner.

All of the embodiments specifically disclosed and described above have in common a concave reflector or reflecting surface which acts to focus or converge reflected sound waves to a focal region wherein is located a pressure-responsive element which marks or otherwise gives intelligence of the location of the reflected wave focus. Where marking is used, it may be directly correlated with an image or a reticulated detector to give an immediate recording of the location of the sound pulse source. Also, a marking or other intelligence of the position of the focus of the reflected wave may be used with an indicator of the center of curvature of the reflecting surface or with a line-of-sight or plane-of-sight extending radially therefrom to give a line or planar directional indication from the observer to the sound pulse source. All of these embodiments secure a directional indication at once, without any delay due to computing or adjusting of the indicating device. While only spherical and cylindrical contours for the reflecting surface have been specifically disclosed and discussed, it will be understood that a reflective surface configuration may be used which technically deviates from these particular contours or curvatures. In general, while certain preferred embodiments of the invention have been specifically illustrated and described, it will be understood that the invention is not limited thereto as many variations will be apparent to those skilled in the art and the invention is to be given its broadest interpretation within the terms of the following claims.

I claim:

1. Apparatus for detecting an acoustic pulse originating within an elected field of view and for indicating the line-of-sight direction from the apparatus to the source of the pulse, said apparatus comprising:

a reflector having a reflecting surface concave toward the field of view, and adapted to collect energy from the wave front of an oncoming pulse and reflect the collected energy from said reflecting surface to converge toward a focal area transverse to the axis of the projected energy and general to all such energy;

a thin diaphragm detector disposed in said general focal area and adapted to render intelligent response to the incidence thereon of any such convergent energy thereby to indicate the direction to the source within the field of view by the position of the area of such incidence on said detector; and a pressure sensitive surface on said diaphragm markable by the incidence thereon of said convergent energy, said pressure sensitive surface being formed of a low-adhesion, high cracking lacquer on a supporting film, said lacquer off-flaking at the focal area of the reflected energy to mark the area of said incidence.

2. The apparatus defined in claim 1 including:
an image of at least a portion of the field of view on said supporting film and correlated to said reflector and receptor means so that the position of the off-flake area on the image directly indicates the direction to the pulse source.

3. The apparatus defined in claim 1 including:
an indicator of the center of curvature of said reflector whereby alignment of the off-flake area with the indicator gives the line-of-sight to the pulse source.

4. The apparatus defined in claim 3 in which:
said reflector and said detector means are transparent to permit alignment of the off-flake area with the indicator by direct visual observation from the convex side of the reflector.

5. The apparatus defined in claim 1 in which:
said lacquer is substantially opaque;
means on said lacquer which is luminescent under light which is invisible to the human eye; and
means for illuminating said luminescent means, whereby said off-flaking removes the luminescent means thereat to make the area of said incidence appear as a hole through the luminescent means.

6. Apparatus for detecting the occurence of an acoustic pulse within an elected field of view and for indicating the line-of-sight direction from the apparatus to the source of the pulse, said apparatus comprising:
an acoustic reflector having an arcuate concave surface fixed in a direction facing the elected field, and adapted to collect energy from the acoustic pulse and reflect and converge said collected energy toward a focal area lying along a straight line which extends through the center of curvature of said arcuate surface and the source of the pulse; and
a detector in said focal area and having means responsive to the incidence of said converged energy reflected from said arcuate surface to provide a visual indication on said detector of the location of said focal area, whereby an observer can locate the line-of-sight direction from the apparatus to the pulse source by visually aligning the center of curvature of the arcuate surface with the indicated focal area on said detector.

7. The apparatus defined in claim 6 in which:
said detector comprises a thin diaphragm having a pressure sensitive surface which is marked by the incidence thereon of the convergent energy.

8. The apparatus defined in claim 7 in which:
said pressure sensitive surface is composed of a low-adhesion, high cracking lacquer on a supporting film, said lacquer off-flaking at the focal area of the reflected energy to mark the area of said incidence.

9. The apparatus defined in claim 8 including:
an indicator of the center of curvature of said reflector whereby alignment of the off-flake area with the indicator gives the line-of-sight to the pulse source.

10. The apparatus defined in claim 9 in which:
said reflector and said detector means are transparent to permit alignment of the off-flake area with the indicator by direct visual observation from the convex side of the reflector.

11. Apparatus for detecting an acoustic pulse originating within an elected field of view and for indicating the direction to the source thereof, said apparatus comprising:
transparent receptor means having a reflecting surface concave toward the field of view and adapted to collect acoustic energy from the wave front of an opening pulse and to project such energy in a beam convergent to an individual focal region contained within a general focal region positioned between the center of reflector curvature and the reflector and extending transverse to the axes of all such so focused beams;
transparent pressure sensitive detector means positioned within and coextensive with said general focal region and adapted to render visual response to the incidence thereon of any such so focused beam, said response corresponding inversely in position to the position of the pulse source within the field of view;
an indicator at the center of curvature of said reflector visible through both said detector and said receptor;
said detector being positioned in the pathway of direct pulses from the source and being of such permeability thereto as to transmit a high percentage of the energy thereof to said reflector;
and said detector being of relatively low marking response characteristic to such direct pulses, and high marking response characteristic to the focused beams from the reflector,
whereby upon the reception of a pulse from the field of view a distinct visible mark is produced thereby on said detector which mark is in the line of sight through said receptor, said detector, and through the center of curvature of said reflector directly to the position of the source of the pulse.

12. Apparatus for detecting an acoustic pulse originating within an elected field of view, and for indicating the direction to the source thereof, said apparatus comprising:
receptor means having a reflecting surface concave toward the field of view and adapted to collect acoustic energy from the wave front of an oncoming pulse and to project such energy into a beam convergent toward an individual focal region contained within a general focal region located between the center of curvature of said reflector and said reflecting surface, and extending transverse to the axes of all such so focused beams;
detector means positioned within and coextensive with said general focal region and comprising a thin diaphragm having a pressure sensitive surface adapted to display a visible marking over the area of incidence thereon of any such so convergent beam, said marking corresponding inversely in position on said detector to the field position of the source within the field of view;
said detector being positioned in the pathway of direct pulses from the source and being of such characteristic thereto as to pass a high percentage of the energy thereof to said reflector;

said detector being of relatively low marking response characteristic to such direct pulses from the source and high marking response characteristic to such so focused beams from said reflector;

and sighting means establishing a line of sight through any such marking on said detector and through the center of curvature of said reflector, whereby upon the reception of an acoustic pulse from the field of view, an operator of the apparatus can obtain a direct line-of-sight to the field position of the source by aligning said marking on said detector and the center of curvature of said reflector.

13. The apparatus defined in claim 12 in which:

said pressure sensitive surface is composed of a low-adhesion, high-cracking lacquer on a supporting film, said lacquer being adapted to off-flake at the focal area of said convergent beam to mark the area of such incidence.

14. The apparatus defined in claim 13 including:

an image of at least a portion of the field of view on said supporting film which image is correlated to said reflector and said center of curvature of said reflector so that the position of the off-flake area on the image directly indicates the direction to the pulse source.

15. The apparatus defined in claim 13 in which:

said receptor and said detector means are transparent to permit alignment of the off-flake area of said diaphragm with said indicator by direct visual observation from the convex side of said reflector.

16. The apparatus defined in claim 13 in which:

said lacquer is substantially opaque;

means on said lacquer which is luminescent under light which is invisible to the human eye; and means for illuminating said luminescent means; whereby said off-flaking removes the luminescent means thereat to make the area of said incidence appear as a hole through the luminescent means.

17. The apparatus defined in claim 12 in which:

the reflecting surface of said receptor is of cylindrical contour concave toward the field of view and said sighting means comprises an indicator positioned at the axis of curvature thereof thereby to establish a plane of sight through said detector marking to, and cutting, the field position of the source of the pulse.

18. Apparatus for detecting an acoustic pulse originating within an elected field of view and for determining a lineation across the field cutting the position of the source of the pulse, said apparatus comprising:

receptor means having a substantially cylindrical reflecting surface concave toward the field of view and adapted to collect acoustic energy from the wave front of an oncoming pulse and to project such energy in a beam convergent to a linear focal region contained within a general focal region positioned between the axis of curvature of said reflector and said reflecting surface, and extending transverse to all such so focused beams;

pressure sensitive detector means positioned within and coextensive with said general focal region and adapted to exhibit a visible linear response to the incidence thereon of any such so focused beam;

said lineation being parallel to the axis of curvature of said reflector and inversely corresponding in transverse position to the transverse position of the source within the field of view;

and sighting means having a linear ocular element and a linear objective element movable together between said detector and said reflector and angularly variable with respect to the instrument general axis, said optical elements being parallel to each other and to the axis of curvature of said reflector in any position, and all thereof are contained within a reference plane which extends radially from the axis of curvature of said reflector to said reflector surface, whereby upon the reception of an acoustic pulse from the field of view and the consequent appearance of such lineation on said detector, an operator of the apparatus can adjust said sighting means to align said optical elements with each other and with such lineation on said detector, thereby to attain a plane of sight direction to and cutting the field position of the source of the pulse.

19. The apparatus defined in claim 18 in which:

said receptor is configurated to afford an operator of the device an optically open region therepast through which region he may visually align said optical elements with each other and with any such marking on said detector from a position behind the convex side of said reflector.

20. Apparatus for detecting an acoustic pulse originating within an elected field of view and for rendering a graphic representation of the field position of the source thereof, said apparatus comprising:

receptor means having a reflecting surface concave toward the field of view and adapted to collect acoustic energy from the wave front of an oncoming pulse and to project such energy into a beam convergent toward an individual focal region contained within a general focal region positioned between the center of curvature of said reflector and said reflecting surface, and extending transverse to the axes of all such so focused beams;

pressure sensitive detector means disposed within and coextensive with said general focal region and adapted to exhibit a visual marking at the area of impingement thereon of any such so focused beams;

said detector being positioned in the pathway of oncoming pulses, and being of such high permeability thereto as to transmit a high percentage of the energy of pulses so intercepted directly to the reflector;

said detector being of relatively low mark-producing sensitivity to pulses oncoming from the source as compared to a high mark-producing sensitivity to the beams focused by the reflector;

and a graphic representation on said detector, each feature of which representation is inversely positioned thereon relative to the corresponding feature of the field of view by a reference line therebetween passing through the center of curvature of said reflector, whereby a pulse originating within the field of view produces a visible marking on said detector inversely related on said graphic representation to the field position of the pulse origin.

21. Apparatus for detecting an acoustic pulse originating within an elected field of view and for exhibiting a representation of the position of the source of such pulse on a photographic image of such field, said apparatus comprising:

receptor means having a reflecting surface concave toward the field of view and adapted to collect acoustic energy from the wave front of an oncoming pulse and to project such energy into a beam convergent toward an individual focal region contained within a general focal region positioned between the center of reflector curvature and the reflector and extending transverse to the axes of all such so focused beams;

pressure sensitive detector means positioned within and coextensive with said general focal region and bearing an inverted photographic image of the field of view to which the apparatus is aimed;

each feature of which photographic image is in alignment through the center of curvature of said reflector with the corresponding feature of the field of view;

said detector being adapted to exhibit a distinct marking at the area of impingement thereon of any beam so focused by said reflector, which marking is indicative in position on said image of the field position of the source of the acoustic pulse;

said detector being positioned within the pathway of direct pulses from the source and being of such permeability thereto as to transmit a high percentage of the energy thereof to said detector;

and said detector being of relatively low marking response characteristic to such direct pulses from the source and high marking response characteristic to the focused beams from the reflector.

22. Apparatus for detecting an acoustic pulse originating within an elected field of view and for indicating the direction to the source thereof, said apparatus comprising:

transparent receptor means having a reflecting surface concave toward the field of view and adapted to collect acoustic energy from the wave front of an oncoming pulse and to project such energy into a beam convergent toward an individual focal region contained within a general focal region positioned between the center of curvature of said reflector and reflector surface, and extending transverse to the axes of all such so focused beams;

transparent pressure sensitive detector means positioned within and coextensive with said general focal region and adapted to render visible marking response to the incidence thereon of any such so focused beam, said marking corresponding inversely in detector position to the field position of the causative source thereof;

and sighting means bearing an ocular element and an objective element movable together between said reflector and said detector, and angularly variable with respect to the instrument general axis, said optical elements being in alignment with each other on a line from the center of curvature of said reflector radially to said reflector surface in any position, whereby, upon the reception of a pulse from the field of view, an operator of the apparatus can obtain a direct line of sight to the field position of the source of the pulse by sighting through the receptor and manually aligning said optical elements with each other and with the resultant marking on said detector.

23. Apparatus for detecting the occurrence, and for locating the position, of the source of an acoustic pulse originating within an elected field of view, said apparatus comprising:

an acoustic reflector of substantially spherical contour positioned with its concave surface toward said field and projective of the energy of a received pulse into a beam convergent toward a focal region residing along a line-of-sight extending through the center of curvature of said reflector directly to the position of the source for all source positions within said field;

and means enabling an operator of the apparatus to locate said line-of-sight without moving the position of said reflector.

24. Apparatus for detecting the occurrence, and for locating the position, of the source of an acoustic pulse originating within an elected field of view, said apparatus comprising:

an acoustic reflector of substantially cylindrical contour positioned with its concave surface toward said field and projective of the energy of a received pulse into a beam convergent toward a linear focal region residing along a plane of sight extending through the axis of curvature of said reflector to and cutting the position of the source for all source positions within said field;

and means enabling an operator of the apparatus to locate said plane of sight without moving the position of said reflector.

* * * * *

PO-1050
(5/69)

UNITED STATES PATENT OFFICE
CERTIFICATE OF CORRECTION

Patent No. 3,723,962     Dated    March 27, 1973

Inventor(s) FRED HOTCHNER

It is certified that error appears in the above-identified patent and that said Letters Patent are hereby corrected as shown below:

Column 5, line 2 "line-of8sight", should be --line-of-sight--

Column 11, line 2 "second", should be --sound--

Signed and sealed this 27th day of November 1973.

SEAL)
ttest:

DWARD M.FLETCHER,JR.                RENE D. TEGTMEYER
ttesting Officer                    Acting Commissioner of Patents